(No Model.)

J. M. THOMPSON.
NUT LOCK.

No. 574,287.  Patented Dec. 29, 1896.

Witnesses
Edwin G. McKee
K. A. ___

Inventor
James M. Thompson
By John Wedderburn
his Attorney

UNITED STATES PATENT OFFICE.

JAMES M. THOMPSON, OF BURNETT, OKLAHOMA TERRITORY.

NUT-LOCK.

SPECIFICATION forming part of Letters Patent No. 574,287, dated December 29, 1896.

Application filed April 2, 1896. Serial No. 585,890. (No model.)

*To all whom it may concern:*

Be it known that I, JAMES M. THOMPSON, a citizen of the United States, residing at Burnett, in the county of Pottawatomie and Territory of Oklahoma, have invented certain new and useful Improvements in Nut-Locks; and I do hereby declare the following to be a full, clear, and exact description of the invention, such as will enable others skilled in the art to which it appertains to make and use the same.

This invention relates to certain new and useful improvements in nut-locks for locking a nut to its bolt; and it has for its object, among others, to provide a simple and cheap form of device for this purpose which shall be positive and reliable in its action, composed of few parts, and those readily assembled and not liable to get out of order.

It comprises a spring-actuated pivoted dog or pawl located in a recess in the nut and adapted to engage the threads of the bolt. It permits of the nut being easily turned in one direction, but prevents its turning in the opposite direction.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1:
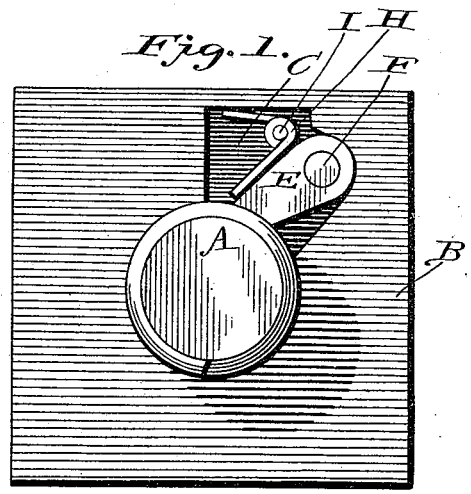
Figure 2:
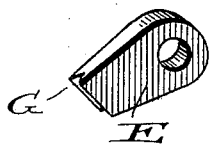
Figure 3:
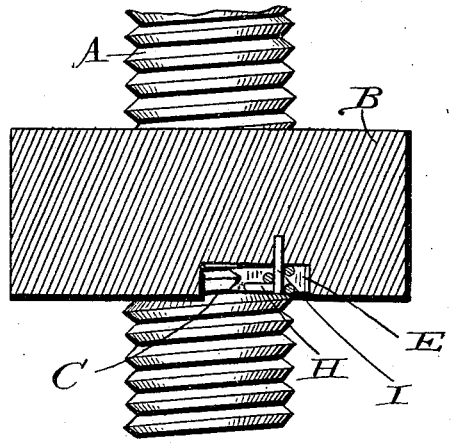

Figure 1 is a view showing the nut in position on the bolt. Fig. 2 is a perspective view of the pawl removed. Fig. 3 is a section through Fig. 1, the section being taken through the pin on which the spring is mounted.

Like letters of reference indicate like parts throughout the several views.

Referring now to the details of the drawings by letter, A designates the bolt, and B the nut, the latter being formed with a recess C, leading from the bolt-opening therein, and within this recess or chamber is pivoted the dog E on a bolt F, held in the said recess parallel with the bolt. The acting face or end of this dog or pawl is grooved, as shown at G, to receive the threads on the bolt and have a bearing upon opposite faces of each thread as the nut is screwed up.

H is a spring secured at one end to or around a pin or projection I in the recess of the nut and its free end bearing against the free end of the dog or pawl to hold it in its engagement with the bolt.

The operation will be apparent. When the nut is turned up, the dog moves to allow of the ready turning of the nut, but when it is attempted to turn the nut in the opposite direction the dog will prevent any movement of the nut. The nut may, however, be taken off when desired by placing a screw-driver or some instrument behind the dog or pawl and holding it out of engagement with the screw-threads of the bolt.

That face of the dog which lies next the nut is somewhat inclined from pivot-pin F to its notched end, as shown in Fig. 3. This construction allows the dog to bind more firmly on the threads of the bolt.

What is claimed as new is—

In a nut-lock, the combination with a screw-threaded bolt, of a nut thereon, said nut being provided with a recess in one face which leads out from the bolt-opening in the nut, a dog pivoted to the nut and lying in the recess, said dog having its face adjacent to the nut inclined from the pivotal point of the dog to the free end thereof, and said dog being provided with a notch at its end, which is adapted to receive one of the screw-threads of the bolt, a pin connected to the nut, and a spring coiled around said pin and having one end abutting on the wall of the recess in the nut, and its other and free end pressing against the dog so as to hold it normally in engagement with the bolt.

In testimony whereof I have signed this specification in the presence of two subscribing witnesses.

JAMES M. THOMPSON.

Witnesses:
ELZA KLINGLESMITH,
J. D. LINCOLN.